(12) United States Patent
Lee et al.

(10) Patent No.: US 7,848,652 B2
(45) Date of Patent: Dec. 7, 2010

(54) WAVELENGTH DIVISION MULTIPLEXING PASSIVE OPTICAL NETWORK SYSTEM AND METHOD OF GENERATING OPTICAL SOURCE

(75) Inventors: Moon Seob Lee, Daejeon (KR); Byung Tak Lee, Kyungki-do (KR); Hyun Seo Kang, Gwangjoo (KR); Jai Sang Koh, Gwangjoo (KR)

(73) Assignee: Electronics and Telecommunications Research Institute (KR)

( * ) Notice: Subject to any disclaimer, the term of this patent is extended or adjusted under 35 U.S.C. 154(b) by 561 days.

(21) Appl. No.: 11/003,282

(22) Filed: Dec. 2, 2004

(65) Prior Publication Data

US 2005/0276606 A1 Dec. 15, 2005

(30) Foreign Application Priority Data

Jun. 9, 2004 (KR) .................... 10-2004-0042214

(51) Int. Cl.
*H04J 14/00* (2006.01)
(52) U.S. Cl. .................. 398/72; 398/66; 398/67; 398/69; 398/70; 398/71; 398/76; 398/82
(58) Field of Classification Search ............. 398/66–82, 398/85; 385/88; 359/341, 341.42
See application file for complete search history.

(56) References Cited

U.S. PATENT DOCUMENTS 5,900,969 A * 5/1999 Srivastava et al. ...... 359/341.42

6,721,506 B1 * 4/2004 Lam ........................... 398/70

(Continued)

FOREIGN PATENT DOCUMENTS

KR 010063062 A 7/2001

(Continued)

OTHER PUBLICATIONS

Sanjoh et al: "Multiwavelength Light Source with Precise Frequency Spacing Using a Mode-Locked Semiconductor Laser and an Arrayed Waveguide Grating Filter", IEEE Photonics Technology Letters, vol. 9, No. 6., Jun. 1997, pp. 818-820.*

(Continued)

*Primary Examiner*—Li Liu
(74) *Attorney, Agent, or Firm*—Blakely, Sokoloff, Taylor & Zafman (57) ABSTRACT

A wavelength division multiplexing passive optical network system is provided. A central office generates a multi-mode light having a mode interval equal to a period interval of a multiplexing filter of the remote node and the multi-mode light is used to control a wavelength of an uplink transmission optical signal of the optical network unit. A remote node multiplexes the multi-mode light with the multiplexing filter to transmit the multiplexed multi-mode light to the optical network unit and demultiplexes the uplink transmission optical signal to transmit the demultiplexed uplink transmission optical signal to the central office. An optical network unit generates the uplink transmission optical signal by modulating a data signal with a Fabry-Perot laser which uses the multiplexed multi-mode light as an injection optical source. Accordingly, it is possible to control a wavelength of a transmitter of the optical network unit by using the injection optical source generated by the central office.

7 Claims, 5 Drawing Sheets

U.S. PATENT DOCUMENTS

| | | | |
|---|---|---|---|
| 2004/0067059 A1* | 4/2004 | Song et al. | 398/82 |
| 2004/0184805 A1* | 9/2004 | Shin et al. | 398/79 |
| 2004/0213574 A1* | 10/2004 | Han et al. | 398/71 |
| 2005/0047727 A1* | 3/2005 | Shin et al. | 385/88 |
| 2005/0105575 A1* | 5/2005 | Kim et al. | 372/43 |

FOREIGN PATENT DOCUMENTS

| | | |
|---|---|---|
| KR | 1020030063085 | 7/2003 |
| KR | 1020030085385 | 11/2003 |
| KR | 10-2005-0023117 | 3/2005 |

OTHER PUBLICATIONS

Sata et al: "Reduction of Mode Partition Noise by Using Semiconductor Optical Amplifiers", IEEE Hournal on Selected Topics in Quantum Electronics, vol. 7, No. 2., Mar./Apr. 2001, pp. 328-333.*

Kim et al: "A Low-Cost WDM Source with an ASE Injected Fabry-Perot Semiconductor Laser", IEEE Photonics Technology Letters, vol. 12, No. 8, Aug. 2000, pp. 1067-1069.*

Zhao et al: "Single-Mode Operation Characteristics of a Self-Injection Seeded Fabry-Perot Laser Diode with Distributed Feedback From a Fiber Grating", IEEE Photonics Technology Letters, vol. 9, No. 11, Nov. 1997, pp. 1436-1438.*

Sato et al: "Reduction of Mode Partition Noise by Using Semiconductor Optical Amplifiers", IEEE Journal on Selected Topics in Quantum Electronics, vol. 7, No. 2., Mar./Apr. 2001, pp. 328-333.*

Electronics Letters, 3rd Jan. 2002, vol. 38, No. 1, pp. 43-45.

IEEE Photonics Technology Letters, vol. 10, No. 9, Sep. 1998, pp. 1337-1339.

* cited by examiner

WAVELENGTH DIVISION MULTIPLEXING PASSIVE OPTICAL NETWORK SYSTEM AND METHOD OF GENERATING OPTICAL SOURCE

BACKGROUND OF THE INVENTION

This application claims the priority of Korean Patent Application No. 2004-42214, filed on Jun. 9, 2004, in the Korean Intellectual Property Office, the disclosure of which is incorporated herein in its entirety by reference.

1. Field of the Invention

The present invention relates to a wavelength division multiplexing passive optical network system and a method of generating an optical source, and more particularly, to an optical communication system capable of controlling wavelengths of optical network units by using an injection optical source generated in a central office and a method of generating an optical source of an optical network unit controlled by the injection optical source of the central office.

2. Description of Related Art

Recently, with rapid increase in transmission data amount, demands for optical transmission using optical fibers have been increased. In particular, with increase in large multimedia data, data transmission of tens or hundreds of megabits per second has been required at optical network units. In order to meet these requirements, optical network systems capable of efficiently transmitting data to optical network units have been actively researched and developed. In particular, in a wavelength division multiplexing passive optical network system, data quality as well as stable data transmission for the optical network units can be ensured by means of division of wavelengths into the optical network units and a large amount of data can be transmitted.

Figure 1:
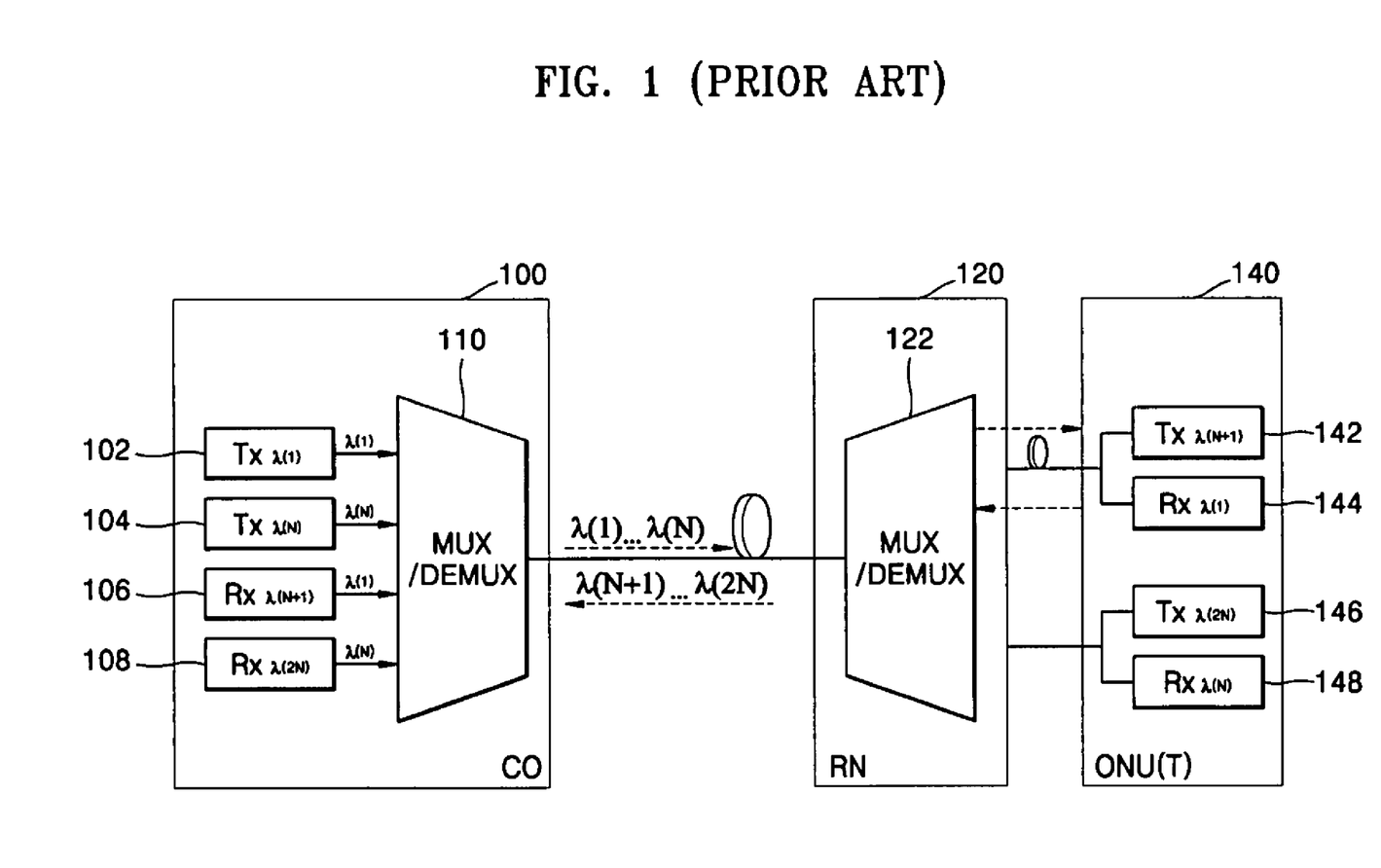
FIG. 1 is a view showing a construction of a conventional wavelength division multiplexing passive optical network system.

FIG. 1 is a view showing a construction of a conventional wavelength division multiplexing passive optical network system.

The conventional wavelength division multiplexing passive optical network system includes a central office (CO) 100, a plurality of optical network units (ONU) 140, and a remote node (RN) 120 for connecting the central office 100 to the optical network units 140. The remote node 120 has a function of multiplexing and demultiplexing uplink and downlink transmission optical signals. The central office 100, the remote node 120, and the optical network units 140 are connected through optical lines.

The central office 100 includes transmitters (Tx) 102 and 104 for outputting an optical signal having a specific wavelength, receivers (Rx) 106 and 108 for detecting data signals having specific wavelengths from the uplink transmission optical signals transmitted from the optical network units 140, and multiplexer/demultiplexer (MUX/DEMUX) 110 for multiplexing and demultiplexing the transmitted and received optical signals.

The optical network units 140 includes receivers (Rx) 144 and 148 for detecting downlink transmission optical signals transmitted via the remote node 120 from the central office 100 and transmitters (Tx) 142 and 146 (located at the optical network unit 140) for generating optical signals used to transmit data via the remote node 120 to the central office 100.

The remote node 120 performs a wavelength multiplexing/demultiplexing process 122 in order to transmit uplink and downlink transmission optical signals.

However, since the conventional wavelength division multiplexing passive optical network system allocates different wavelengths to the optical network units 140, there is a problem in that the central office 100 necessarily includes the transmitters 102 and 104 corresponding to different wavelengths. In addition, there is another problem in that a side mode suppression ratio (SMSR) has to be lowered in order to stabilize an output optical power and minimize inter-channel interference. In addition, since a price of the wavelength division multiplexing passive optical network system is mostly determined by expensive optical devices, there is still another problem in that it is difficult to implement an economical system.

In order to solve the problems, wavelength division multiplexing passive optical network system using inexpensive optical devices have be proposed in the following articles and patent documents, for example.

In an article titled "A Spectrally Sliced PON Employing Fabry-Perot Lasers" (IEEE Photonics Technology Letter, Vol 10, pp. 1337, 9. September 1998), a Fabry-Perot laser of which light is directly modulated into an inexpensive optical source is used. The inexpensive optical source can be implemented by spectrally slicing modes of the Fabry-Perot laser by using a wavelength division multiplexing router.

However, clipping and forward error correction (FEC) processes are required due to mode partition noise of the Fabry-Perot laser. There are problems in that a low transmission rate and an error flow involved in transmission occur. Therefore, it is difficult to adapt this technique to a practical system.

Approaches for solving the problems are proposed in an article titled "Upstream Traffic Transmitter Using Injection-locked Fabry-Perot As Modulator For WDM Access Networks" (IEEE Photonics Technology Letter, Vol. 38, NO. 1, pp.43-44, 2002) and the Korean Patent Application No. 1999-59923. Here, in order to solve several problems of the Fabry-Perot laser, the Fabry-Perot laser is used for an optical source of optical network units and a distributed feedback laser or a natural emission optical source is used as an injection optical source of the Fabry-Perot laser.

However, although inexpensive optical network units can be implemented, the distributed feedback lasers and the natural optical sources are still expensive, so that it is difficult to implement an inexpensive optical network system.

In the Korean Patent Application No. 2002-23793 titled "Wavelength Division Multiplexing Passive Optical Network System Capable Of Controlling Wavelength Of Optical Network Unit," a Fabry-Perot laser is used for an injection optical source. However, since the Fabry-Perot laser is simply as an injection optical source, there is a difficulty in transmission due to mode hopping, mode partition noise, and fluctuation of a central wavelength.

SUMMARY OF INVENTION

The present invention provides a wavelength division multiplexing passive optical network system capable of controlling a wavelength of a transmitter of optical network unit by using an injection optical source having periodical and stable modes with a stable output power and minimized inter-channel interference.

The present invention also provides a method of generating an optical source of a transmitter of an optical network unit controlled by an injection optical source of a central office.

According to an aspect of the present invention, there is provided a wavelength division multiplexing passive optical network system having a central office, a remote node, and an optical network unit, comprising: the central office generating a multi-mode light having a mode interval equal to a period interval of a multiplexing filter of the remote node, the multi-mode light being used to control a wavelength of an uplink transmission optical signal of the optical network unit;

the remote node demultiplexing the multi-mode light with the multiplexing filter to transmit the demultiplexed multi-mode light to the optical network unit and multiplexing the uplink transmission optical signal to transmit the multiplexed uplink transmission optical signal to the central office; and the optical network unit generating the uplink transmission optical signal by modulating a data signal with a Fabry-Perot laser, the Fabry-Perot laser using the multiplexed multi-mode light as an injection optical source.

According to another aspect of the present invention, there is provided a method of generating an optical source in a wavelength division multiplexing passive optical network system having a central office, a remote node, and a least one optical network unit, comprising: generating a multi-mode light having a mode interval equal to a period interval of a multiplexing filter of the remote node, the multi-mode light being used to control a wavelength of an uplink transmission optical signal of the optical network unit; multiplexing the multi-mode light with the multiplexing filter to transmit the multiplexed multi-mode light to the optical network unit; and generating the uplink transmission optical signal by modulating a data signal with a Fabry-Perot laser, the Fabry-Perot laser using the multiplexed multi-mode light as an injection optical source.

Accordingly, it is possible to control a wavelength of a transmitter of the optical network unit by using the injection optical source generated by the central office.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, a wavelength division multiplexing passive optical network system and a method of generating an optical source according to the present invention will be described in detail with reference to the accompanying drawings.

Figure 2:
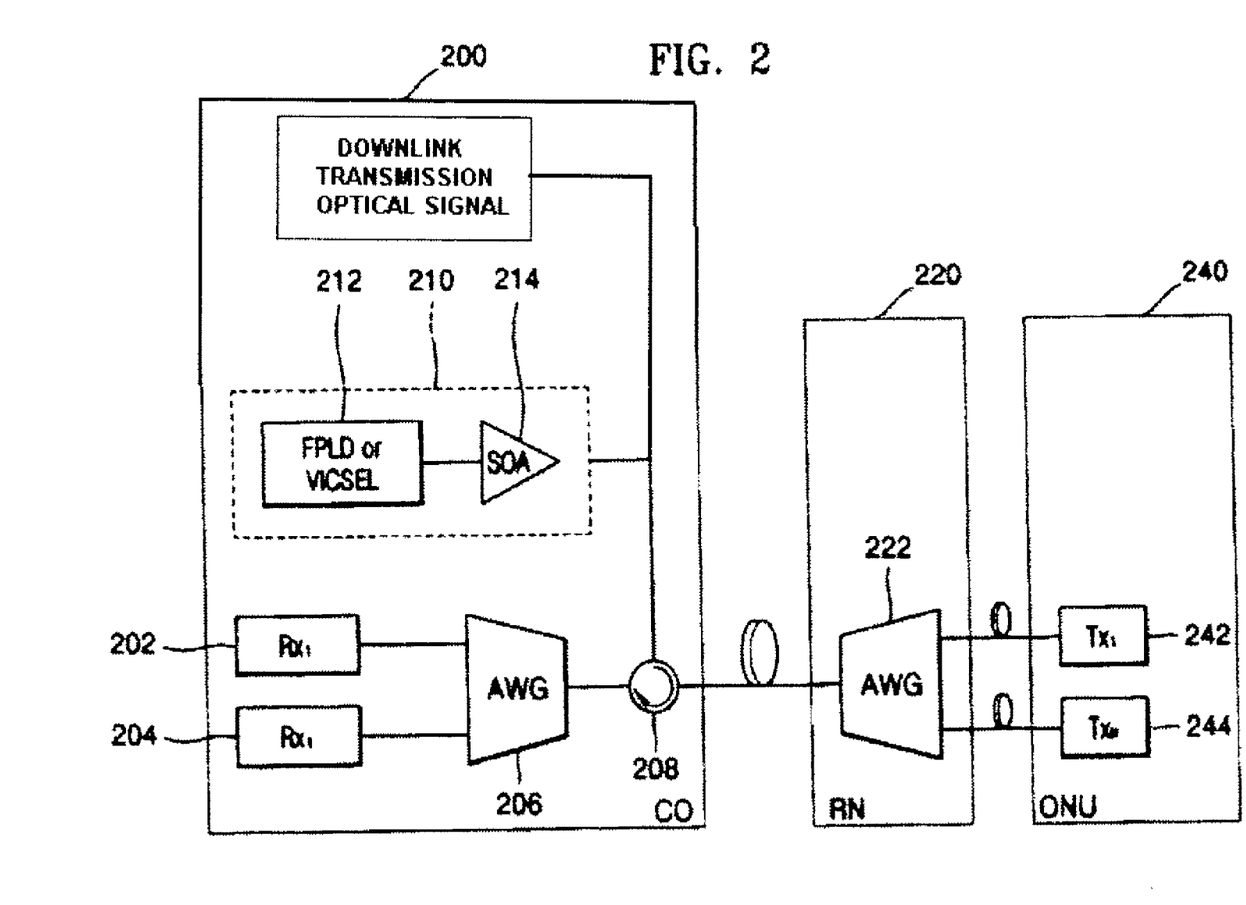
FIG. 2 is a view showing a construction of a wavelength division multiplexing passive optical network system according to the present invention.

FIG. 2 is a view showing a construction of a wavelength division multiplexing passive optical network system according to the present invention.

The wavelength division multiplexing passive optical network system includes a central office (CO) 200, a remote node (RN) 220, and an optical network unit (ONU) 240. The central office 200, the remote node 220, and the optical network unit 240 are connected through single-mode fibers.

The central office 200 includes an injection optical source unit 210 for generating a multi-mode light as an injection optical source used to control wavelengths at transmitters (Tx) 242 and 244 of the optical network unit 240, receivers (Rx) 202 and 204 for receiving an uplink transmission optical signal transmitted from the optical network unit 240, a transmission unit (not shown) for generating a downlink transmission optical signal carrying data, a demultiplexer 206 for demultiplexing the uplink transmission optical signal and transmitting the demultiplexed uplink transmission optical signal to the receivers 202 and 204, and a circulator 208.

The injection optical source unit 210 generates the multi-mode light having a mode interval equal to a period interval of the multiplexing filter 222 of the remote node 220. In addition, it is preferable that central wavelengths of modes of the multi-mode light be equal to a central wavelength of the multiplexing filter 222. The injection optical source unit 210 controls the central wavelengths of the modes by adjusting driving current of a laser used to generate the multi-mode light. More specifically, the injection optical source unit 210 generates the multi-mode light by using the Fabry-Perot laser, VICSEL laser 212, and a semiconductor optical amplifier (SOA) 214 in which an isolator is removed. The construction and functions of the injection optical source unit 210 will be described later in detail with reference to FIG. 3.

The demultiplexer 206 of the central office 200 demultiplexes the uplink transmission optical signal transmitted from the remote node 220 and transmits the demultiplexed uplink transmission optical signal to the associated receivers 202 and 204.

The circulator 208 is connected to the remote node 220 via the optical line. The circulator 208 transmits the multi-mode light (the injection optical source) generated by the injection optical source unit 210 and the downlink transmission optical signal of the transmission unit (not shown) of the central office 200 to the remote node 220. In addition, the circulator 208 transmits the uplink transmission optical signal from the remote node 220 via the demultiplexer 206 to the receivers 202 and 204.

The remote node 220 demultiplexes the downlink transmission optical signal transmitted from the central office 200 and the multi-mode light used to control wavelengths at the transmitters 242 and 244 of the optical network unit 240 and transmits the demultiplexed signal to the optical network unit 240. The remote node 220 multiplexes the uplink transmission optical signal transmitted from the transmitters 242 and 244 and transmits the multiplexed uplink transmission optical signal to the central office 200.

The remote node 220 uses one of an arrayed waveguide grating (AWG), a waveguide grating router, a grating, and a filter as a multiplexing filter 222 for multiplexing/demultiplexing. The mode interval and central wavelength of the multi-mode light of the central office 200 are determined based on the period interval of the multiplexing filter 222 of the remote node 220.

The optical network unit 240 includes a receiver (not shown) for receiving the multiplexed downlink transmission optical signal from the remote node 220 and transmitters 242 and 244 for generating the uplink transmission optical signal by modulating a data signal based on the multi-mode light, which is the injection optical source demultiplexed by and transmitted from the remote node 220. That is, the optical network unit 240 modulates the uplink transmission optical signal based on the wavelength of the injected multi-mode light, so that wavelength can be controlled by using the injection optical source of the injection optical source unit 210 of the central office 200.

More specifically, each of the transmitters 242 and 244 of the optical network unit 240 modulates the data signal by using the Fabry-Perot laser, the VICSEL laser, or the semiconductor optical amplifier which uses the multi-mode light as the injection optical source to generate the uplink transmission optical signal. Each of the transmitters 242 and 244 transmits the uplink transmission optical signal to the central office 200 via the remote node 220.

Figure 3:
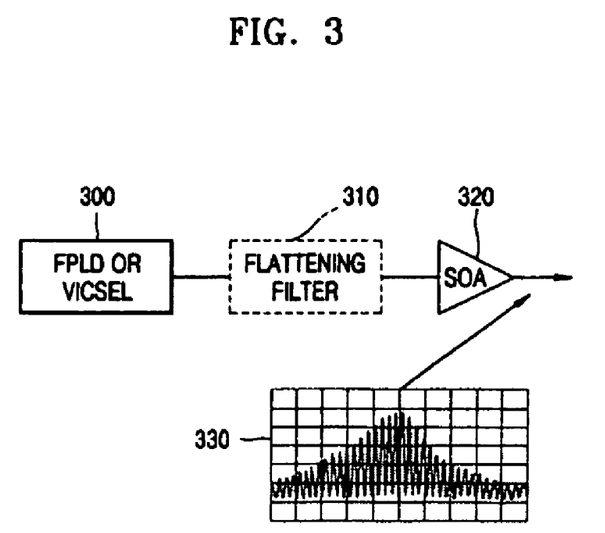
FIG. 3 is a view showing a construction of an injection optical source for controlling wavelengths at an optical network unit according to the present invention.

FIG. 3 is a view showing a construction of an injection optical source for controlling wavelengths at an optical network unit according to the present invention.

The injection optical source unit 210 includes a light generation unit 300, a filter unit 310, and an amplification unit 320.

The light generation unit 300 generates a multi-mode light having a mode interval equal to the period interval of the multiplexing filter 222 of the remote node 220. In general, the light generation unit 300 is constructed with the Fabry-Perot laser and the VICSEL laser, so that the mode interval can be equal to the period interval of the multiplexing filter 222 and the multi-mode light can be generated with the lasers. In addition, a plurality of optical sources having similar powers in the respective modes thereof may be used.

Now, a light generation unit 300 constructed with a Fabry-Perot laser will be described.

The Fabry-Perot laser uses an amplification unit 320 to solve the problem in that output powers of modes may be change in time due to the mode partition noise and the fluctuation of the central wavelength. The amplification unit 320 performs a self injection on the Fabry-Perot laser (the light generation unit 300) by using a fixed-gain semiconductor optical amplifier without an isolator.

More specifically, the amplification unit 320 generates the multi-mode light output from the Fabry-Perot laser bi-directionally. Since the multi-mode light amplified by the amplification unit 320 is output in a direction (a feedback direction) to the Fabry-Perot laser, the multi-mode light of the Fabry-Perot laser is sent as a feedback (self-injected). As a result, the multi-mode light having constant optical powers in the modes without fluctuation of the central wavelength can be generated.

In order words, the injection optical source unit 210 constructed by combining the Fabry-Perot laser and the semiconductor optical amplifier has enough power to transmit signals to the optical network unit 240 and generates the multi-mode light without mode partition noise and fluctuation of the central wavelength.

In a case where the optical powers in the modes of the Fabry-Perot laser are different, the filter unit 310 further includes a flattening filter between the light generation unit 300 and the amplification unit 320 in order to remove difference of optical intensities of the injection optical sources used to control the transmitters 242 and 244 of the optical network units 240.

Figure 4:
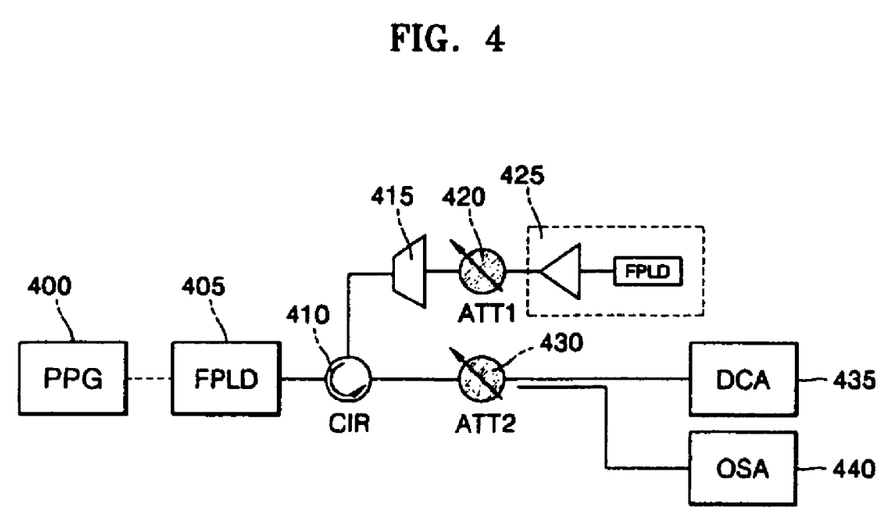
FIG. 4 is a view showing a construction of a test system for testing an injection optical source according to the present invention.
Figure 5A:
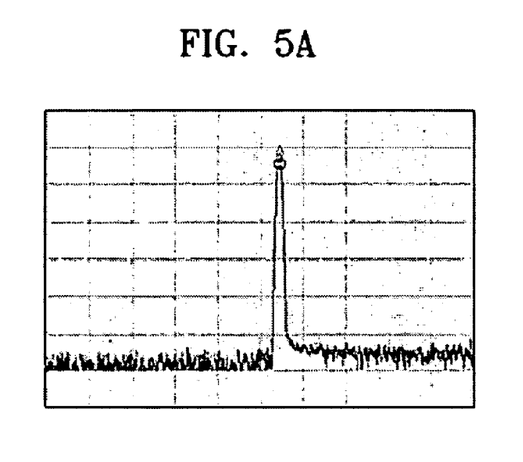
FIGS. 5a to 5c are view showing test results of the test system using the injection optical source of FIG. 4.
Figure 5B:
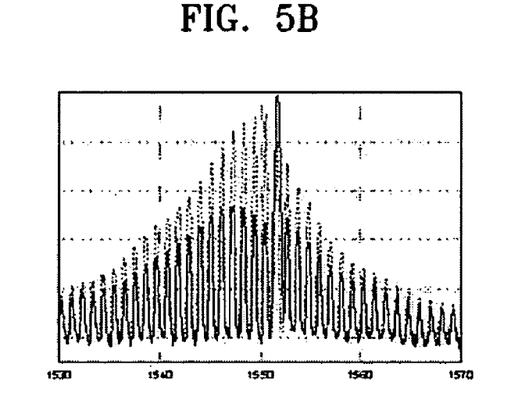
Figure 5C:
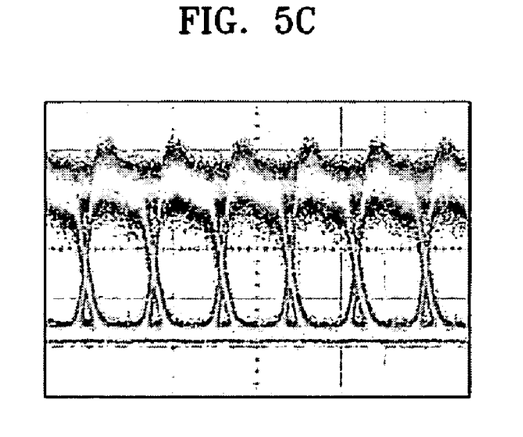

FIG. 4 is a view showing a construction of a test system for testing an injection optical source according to the present invention. FIGS. 5*a* to 5*c* are view showing test results of the test system using the injection optical source of FIG. 4.

The test system includes a pulse pattern generator (PPG) 400, a Fabry-Perot laser 405, a circulator 410, a multiplexer 415, a first optical attenuator 420, a second optical attenuator 430, an injection optical source unit 425 according to the present invention, an oscillator (digital communication analyzer; DCA) 435, and an optical spectrum analyzer (OSA) 440. Here, the Fabry-Perot laser corresponds to the transmitters 242 and 244 of the optical network unit 240 of FIG. 2.

A light generated by the injection optical source unit 425 according to the present invention passes through the first optical attenuator 420 and a wavelength thereof is divided by the multiplexer 415. The wavelength-divided light passes through the circulator 410 and is injected into the Fabry-Perot laser 405.

The Fabry-Perot laser 405 outputs an optical signal which is 1.2 Gbps-modulated by the pulse pattern generator 400. The output optical signal passes through the circulator 410 and the second optical attenuator 430 and is measured with the digital communication analyzer (DCA) 435 and the optical spectrum analyzer (OSA) 440. The measuring results are shown in FIGS. 5*a* to 5*c*.

FIG. 5*a* is a view showing output characteristics of the injection optical sources with respect to wavelength. FIG. 5*b* is a view showing measuring results where a doted line indicates the measuring result obtained by using a conventional injection optical source and a solid line indicates the measuring result obtained by using the injection optical source according to the present invention. FIG. 5*c* is an eye diagram obtained by using the injection optical source according to the present invention.

Referring to FIGS. 5*a* to 5*c*, it can be understood that it is possible to effectively control wavelengths at the transmitters of the optical network unit in the wavelength division multiplexing passive optical network system by using the injection optical source according to the present invention.

Figure 6:
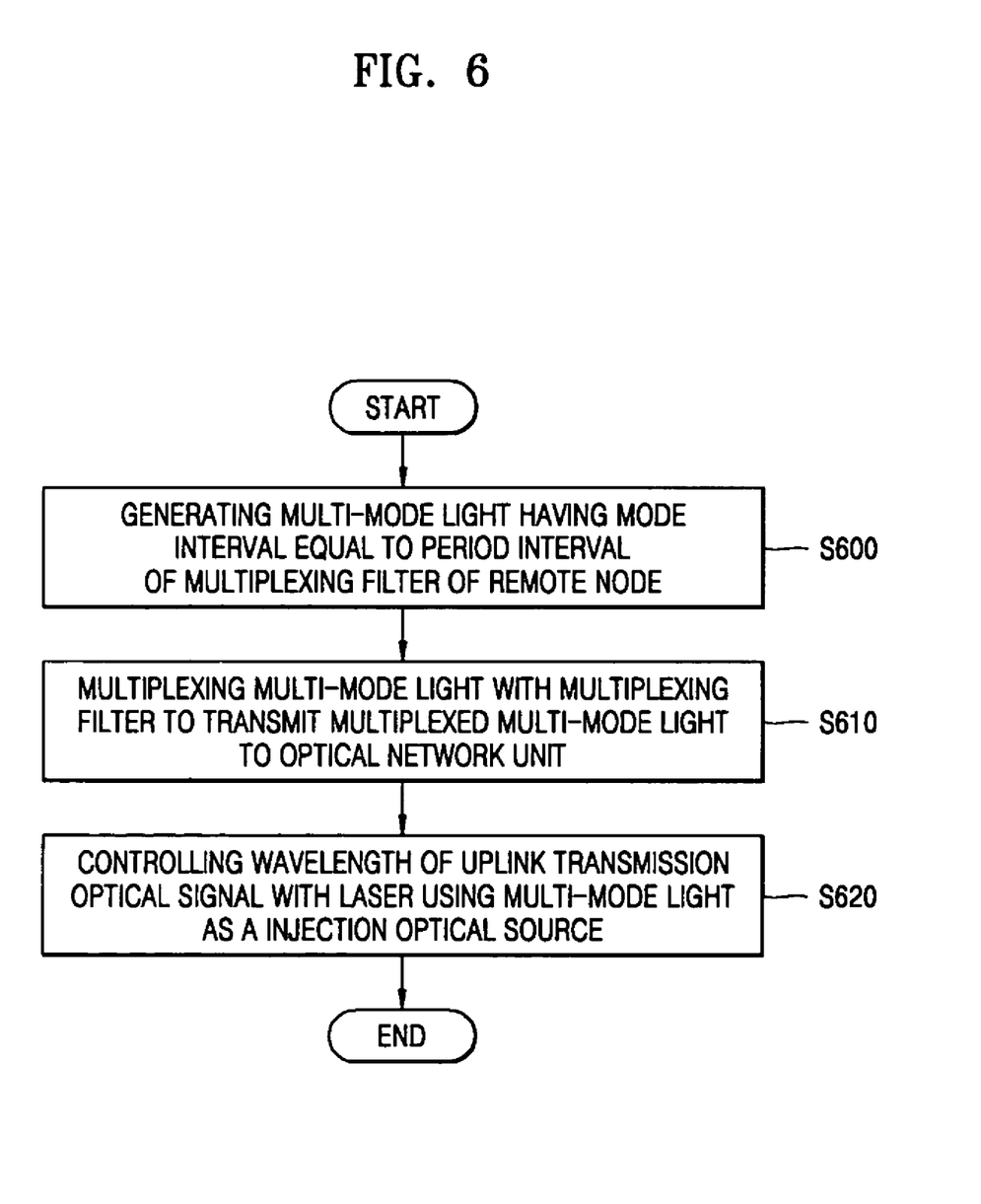
FIG. 6 is a flowchart showing a method of generating an optical source according to an embodiment of the present invention.

FIG. 6 is a flowchart showing a method of generating an optical source according to an embodiment of the present invention.

A central office 200 generates a multi-mode light having a mode interval equal to a period interval of a multiplexing filter 222 of a remote node 220 and outputs the multi-mode light (S600). A remote node 220 multiplexes the multi-mode light output from the central office 200 through the multiplexing filter 222 and transmits the multiplexed multi-mode light to an optical network unit 240.

Each of the optical network units 240 generates an uplink transmission optical signal by using a laser which uses the received multi-mode light as the injection optical source (S620). That is, transmitters 242 and 244 of the optical network unit 240 generates the uplink transmission optical signal by modulating a data signal with the Fabry-Perot laser which uses the multi-mode light as the injection optical source.

According to the present invention, it is possible to generate a stable high-power multi-mode light by amplifying output of a Fabry-Perot laser or a VICSEL laser and sending the output as a feedback. In addition, it is possible to control wavelengths at transmitters of a plurality of optical network units by using the generated multi-mode light as an injection optical source of the transmitters of the optical network units. Therefore, it is possible to implement a stable optical link and an inexpensive wavelength division multiplexing passive optical network system.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A wavelength division multiplexing passive optical network system comprising a central office, a remote node, and an optical network unit, characterized in that the central office generating a multi-mode light having a mode interval equal to a period interval of a multiplexing filter of the remote node, the multi-mode light being used to control a wavelength of an uplink transmission optical signal of the optical network unit, and the central office amplifying the multi-mode light to be self-injected by using a fixed-gain optical amplifier without an isolator, the central office to transmit the multi-mode light and a downlink transmission optical signal to the optical network unit;

the remote node demultiplexing the multi-mode light with the multiplexing filter to transmit the demultiplexed multi-mode light to the optical network unit and multiplexing the uplink transmission optical signal to transmit the multiplexed uplink transmission optical signal to the central office;

the optical network unit generating the uplink transmission optical signal by modulating a data signal with a Fabry-Perot laser, the Fabry-Perot laser using the multiplexed multi-mode light as an injection optical source; and an amplification unit amplifying the multi-mode light to obtain constant gains in the modes of the multi-mode light by using a fixed-gain semiconductor optical amplifier without an isolator and sending the amplified multi-mode light as a feedback to the Fabry-Perot laser;

wherein the central office further comprises a light generation unit and a filter unit flattening outputs of the modes of the multi-mode light by using a flattening filter provided between the light generation unit and the amplification unit.

2. The wavelength division multiplexing passive optical network system according to claim 1, wherein the central office comprises:

an injection optical source unit;

a receiver receiving the uplink transmission optical signal; and a circulator provided between the injection optical source unit and the receiver, the circulator transmitting the multi-mode light to the remote node and transmitting the uplink transmission optical signal to the receiver.

3. The wavelength division multiplexing passive optical network system according to claim 1, wherein the light generation unit generates the multi-mode light having the mode interval equal to the period interval of the multiplexing filter of the remote node.

4. The wavelength division multiplexing passive optical network system according to claim 3, wherein the light generation unit generates the multi-mode light by using the Fabry-Perot laser or a VICSEL laser.

5. A method of generating an optical source in a wavelength division multiplexing passive optical network system having a central office, a remote node, and a least one optical network unit, comprising:

generating a multi-mode light having a mode interval equal to a period interval of a multiplexing filter of the remote node by amplifying the multi-mode light to be self-injected by using a fixed-gain optical amplifier without an isolator, the multi-mode light being used to control a wavelength of an uplink transmission optical signal of the optical network unit, the multi-mode light and a downlink transmission optical signal to be transmitted to the optical network unit;

wherein the generating of the multi-mode light comprises flattening outputs of the modes of the multi-mode light;

demultiplexing the multi-mode light with the multiplexing filter to transmit the demultiplexed multi-mode light to the optical network unit;

generating the uplink transmission optical signal by modulating a data signal with a Fabry-Perot laser, the Fabry-Perot laser using the demultiplexed multi-mode light as an injection optical source; and amplifying the multi-mode light to obtain constant gains in the modes of the multi-mode light by using a fixed-gain semiconductor optical amplifier without an isolator and sending the amplified multi-mode light as a feedback to the Fabry-Perot laser.

6. The method according to claim 5, wherein the generating of the multi-mode light comprises:

generating the multi-mode light having the mode interval equal to the period interval of the multiplexing filter of the remote node.

7. The method according to claim 5, wherein the generating of the multi-mode light comprises generating the multi-mode light by using the Fabry-Perot laser or a VICSEL laser.

* * * * *